(12) United States Patent
Hyatt (10) Patent No.: US 9,975,650 B2
(45) Date of Patent: May 22, 2018

(54) AIRCRAFT HANDLER

(71) Applicant: CURTISS-WRIGHT FLOW CONTROL (UK) LIMITED, Bridport, Dorset (GB)

(72) Inventor: Daniel William Hyatt, Cheltenham (GB)

(73) Assignee: CURTISS-WRIGHT FLOW CONTROL (UK) LIMITED, Dorset (GB)

( * ) Notice: Subject to any disclaimer, the term of this patent is extended or adjusted under 35 U.S.C. 154(b) by 416 days.

(21) Appl. No.: 14/801,922

(22) Filed: Jul. 17, 2015

(65) Prior Publication Data

US 2015/0321771 A1    Nov. 12, 2015

Related U.S. Application Data

(62) Division of application No. 10/992,862, filed on Nov. 19, 2004, now Pat. No. 9,428,283.

(30) Foreign Application Priority Data

Feb. 19, 2004  (GB) .................................. 0403693.5

(51) Int. Cl.
  *B60B 29/00*  (2006.01)
  *B64F 1/22*  (2006.01)
(52) U.S. Cl.
  CPC .................................. *B64F 1/227* (2013.01)
(58) Field of Classification Search
  CPC ................................ B66F 1/00; B60B 29/002
  USPC .................... 414/427, 429; 180/904; 244/50; 294/86.4; 269/266
  See application file for complete search history.

(56) References Cited

U.S. PATENT DOCUMENTS

| 626,427   | A | 6/1899  | Jones    |
| 2,754,708 | A | 7/1956  | Peterson |
| 2,846,018 | A | 8/1958  | Puckett  |
| 3,049,253 | A | 8/1962  | Cabral   |
| 3,349,655 | A | 10/1967 | Locke    |
| 3,698,267 | A | 10/1972 | Denney   |

(Continued)

FOREIGN PATENT DOCUMENTS

| EP | 0706860 | 4/1996 |
| GB | 835226  | 5/1960 |

(Continued)

OTHER PUBLICATIONS

For PCT/GB2005/000375: International Search Report dated Nov. 16, 2005 and International Preliminary Report on Patentability with Written Opinion dated Aug. 22, 2006.

*Primary Examiner* — Saul Rodriguez
*Assistant Examiner* — Willie Berry, Jr.
(74) *Attorney, Agent, or Firm* — Pearne & Gordon LLP (57) ABSTRACT

A lifting tool 100 form part of a lifting apparatus associated with an aircraft handler 10 for applying a lifting load to an undercarriage of an aircraft. The lifting apparatus comprise a pair of opposed lifting tools 100 which engage end portions of an undercarriage wheel axle 300 for lifting. Each lifting tool 100 has a body 101 with a cavity 103 therein filled with a plurality of axially displaceable closely packed pins 105 which permit insertion of a portion of the axle or adaptor means into the cavity, and other pins, in use, surrounding said portion provide support and transfer the lift load to the surrounding body 101.

19 Claims, 4 Drawing Sheets

(56) References Cited

U.S. PATENT DOCUMENTS

| | | | |
|---|---|---|---|
| 3,895,828 A | | 7/1975 | Bitantis |
| 4,572,564 A | | 2/1986 | Cipolla |
| 4,609,220 A | | 9/1986 | Scott |
| 4,896,914 A | | 1/1990 | Stevens |
| 5,011,207 A | | 4/1991 | Stevens |
| 5,110,067 A | | 5/1992 | Sinkkonen |
| 5,151,003 A | | 9/1992 | Zschoche |
| 5,403,057 A | | 4/1995 | Sugito et al. |
| 5,407,185 A | | 4/1995 | Zehnpfennig et al. |
| 5,460,064 A | | 10/1995 | Zayat, Jr. |
| 5,622,090 A | | 4/1997 | Marks |
| 5,655,733 A | * | 8/1997 | Roach .................. B62B 3/0625 244/17.17 |
| 5,791,209 A | | 8/1998 | Marks |
| 5,806,385 A | | 9/1998 | Schuup |
| 6,085,619 A | | 7/2000 | Blake et al. |
| 6,138,534 A | | 10/2000 | Cho |
| 6,374,710 B2 | | 4/2002 | Kuo |
| 6,792,835 B1 | | 9/2004 | Quick et al. |
| 6,928,906 B1 | | 8/2005 | Marks |
| 6,945,354 B2 | | 9/2005 | Goff |
| 7,125,010 B2 | | 10/2006 | Moore et al. |
| 2004/0074677 A1 | | 4/2004 | Goff |
| 2004/0105746 A1 | | 6/2004 | Nolasco |
| 2005/0186055 A1 | | 8/2005 | Hyatt |
| 2015/0321771 A1 | | 11/2015 | Hyatt |

FOREIGN PATENT DOCUMENTS

| | | |
|---|---|---|
| GB | 2391205 | 2/2004 |
| JP | 2000503599 | 3/2000 |
| JP | 2007522998 | 8/2007 |
| WO | 2005080197 | 9/2005 |

* cited by examiner

AIRCRAFT HANDLER

FIELD OF THE INVENTION

This invention related to an aircraft handler for use with the nose wheel or tail wheel of aircraft, including helicopters.

BACKGROUND OF THE INVENTION

A conventional aircraft self-propelled handler typically has a wheeled rectangular body having a pair of jaws at the front of the body which can clamp against the opposite sides of the tires on the wheel or wheels of an undercarriage, typically the front undercarriage and lift the wheel(s) off the ground, to effect a handling operation for example a tow. A problem with the use of clamping jaws for lifting aircraft by the tire(s) is that pairs of jaws need to be shaped specifically for use in lifting particular aircraft. Furthermore the shape of an aircraft tire will vary according to different parameters such tire pressure, temperature and the weather. If the tire is flat the lifting jaws cannot be used in lifting and manoeuvring the aircraft.

Pairs of clamping jaws are also relatively expensive to manufacture.

Another problem associated with the use of clamping jaws is that the handler may require several attempts manoeuvring around the undercarriage before it is correctly position for the lifting operation.

The present invention provides an aircraft handler which is easily aligned relative to an undercarriage for a lifting and/or towing operation.

STATEMENTS OF THE INVENTION

According to the present invention there is provided a lifting tool for engaging with a portion of an object to be lifted, the lifting tool having a body with a cavity therein filled with a plurality of closely packed pins which provide load bearing surfaces which in use engage a portion of said object, the pins being individually axially displaceable within the cavity to permit limited movement of at least some of said pins on insertion of said portion into the cavity with other pins surrounding said portion to provide support and transfer the lift load to the surrounding body.

By axially displaceable is meant along the longitudinal axis of the pins.

The pins may be of any suitable cross-section which facilitates their close packing and may be circular in section or polygonal, preferably square or hexagonal.

Preferably, the pins are resiliently biased outwardly of the pad and have outer end faces which together form a substantially planar surface. Any one pin when at maximum inward displacement is supported on its surrounding adjacent pins.

The inner ends of the pins are slid ably mounted to the base of the cavity. The base of the cavity may be detachable from the body allowing the pins and base to be removed and attached as a single sub-assembly.

The cavity may be any desired shape and is preferably hexagonal in section and the pins have either a circular or hexagonal section. In use two of the sides of said hexagonal cavity are substantially horizontal and when using circular pins, at least the other sides may be provided with arcuate concave recesses to accommodate an adjacent pin.

According to a second aspect of the present invention there is provide a lifting apparatus comprising a pair of lifting tools according to the first aspect of the invention and which in use engage opposite end portions of an object to be lifted.

The apparatus comprises a ground standing body with a pair of lifting arms pivotally mounted on the body for rotation about a substantially horizontal axis to lower or lift the distal end of the arms, each arm being provided with a lifting tool at its distal end, the two arms also being pivoted around a second axis, normal to the horizontal axis, for moving the lifting tools towards or away from each other.

A third aspect of the invention provided an aircraft handler for use with the undercarriage of an aircraft, and which includes lifting apparatus as disclosed above.

Preferably, the handler is self-propelled and comprises a generally "u" shaped ground standing body having a pair of arms linked by a bridge at one end thereof with a pair of drive wheels located one at the free end of each arm, at least one wheel located adjacent the bridge, with two lifting arms being pivoted to the two arms of the body and located between the drive wheels. A similar aircraft handler is disclosed in GB-A-2391 205.

The lifting arms may be mounted on a bar extending between the two arms of the body or alternatively on a pair of coaxial stub axles mounted one on each arm. The opposite ends of said bar or stub axles are provided with radial lugs and actuators acting between a respective arm of the body and lug rotate the bar or respective stub axles to raise or lower the lifting arms.

Each lifting arm is held rotationally fast in one orthogonal axis in a diametral slot in the inner end of each respective stub axle and is pivoted in the other orthogonal axis to the respective stub axle normal to the slots.

Actuators are operable to move the arms towards or away from each other.

The lifting arms preferably each comprise a pair of substantially parallel struts each of which is pivoted at one end to the stub axle and the other end to the lifting tool thereby forming a four bar parallelogram linkage which ensures that the lifting tools remain substantially horizontal during their lifting and lowering movements.

The lifting apparatus may also further include adaptor means which engages the object to be lifted and which have a spigot thereon which is engageable within the cavity of the lifting tool.

For applying a lifting load to aircraft undercarriages the adaptor means may comprise a first coaxial spigot to one side of a disc and which is engageable within the cavity of the lifting tool and a second coaxial spigot on the other side of the disc for engaging a cavity a tow point on the undercarriage. Such tow points may be provided in the ends of the aircraft wheel axle or a reinforced section of the undercarriage structure.

A further aspect of the invention provides a method of application of a lifting load to an object in which a lifting apparatus according to a second aspect of the present invention is caused to engage opposed portions of the object to be lifted when on the ground, said opposed portions being accommodated within the respective cavities of the lifting tools, and supported on the surrounding pins, and then applying a lifting load to said object.

An advantage of said method is that the opposed portions to which the lift load is applied do not need to be exactly in alignment with each other, or with the centres of the cavities in the lifting tools since the pins within the cavity are displaceable to accommodate the lift portion at any location within the cavity, and the surrounding close packed pins provide the necessary support during the lift.

Yet another aspect of the present invention also provides a method of application of a lifting load to an aircraft undercarriage in which method adaptor means is inserted one on each side of a tow point on an aircraft undercarriage and an aircraft handler according to a third aspect of the invention is operated so that the two lifting tools each engage a respective adaptor means for application of a lifting load.

DESCRIPTION OF THE DRAWINGS

The invention will be described by way of example and with reference to the accompanying drawings in which.

DETAILED DESCRIPTION OF THE INVENTION

Figure 1:
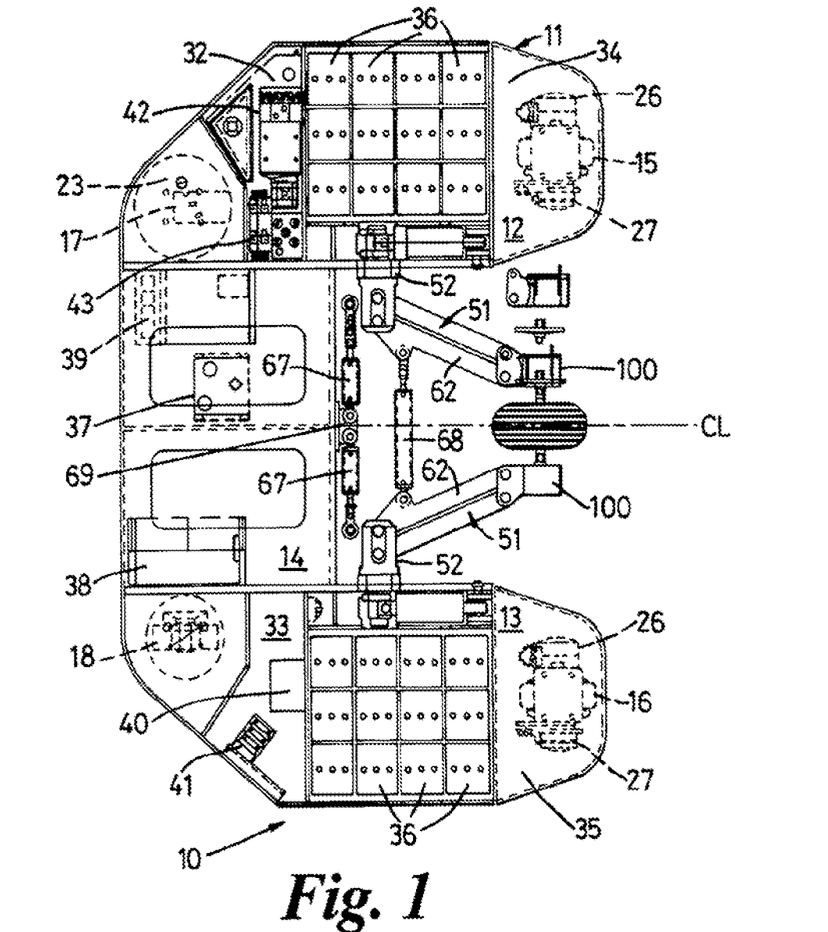
FIG. 1 is a plan view of an aircraft handler according to the present invention.
Figure 2:
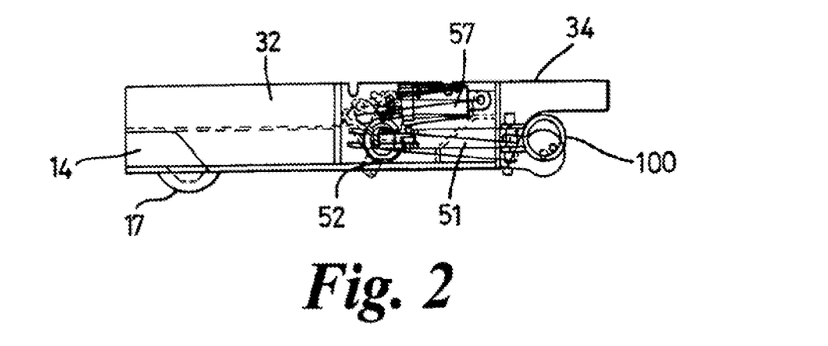
FIG. 2 is a cross-sectional view take on the centre line CL of the handler of FIG. 1.
Figure 3:
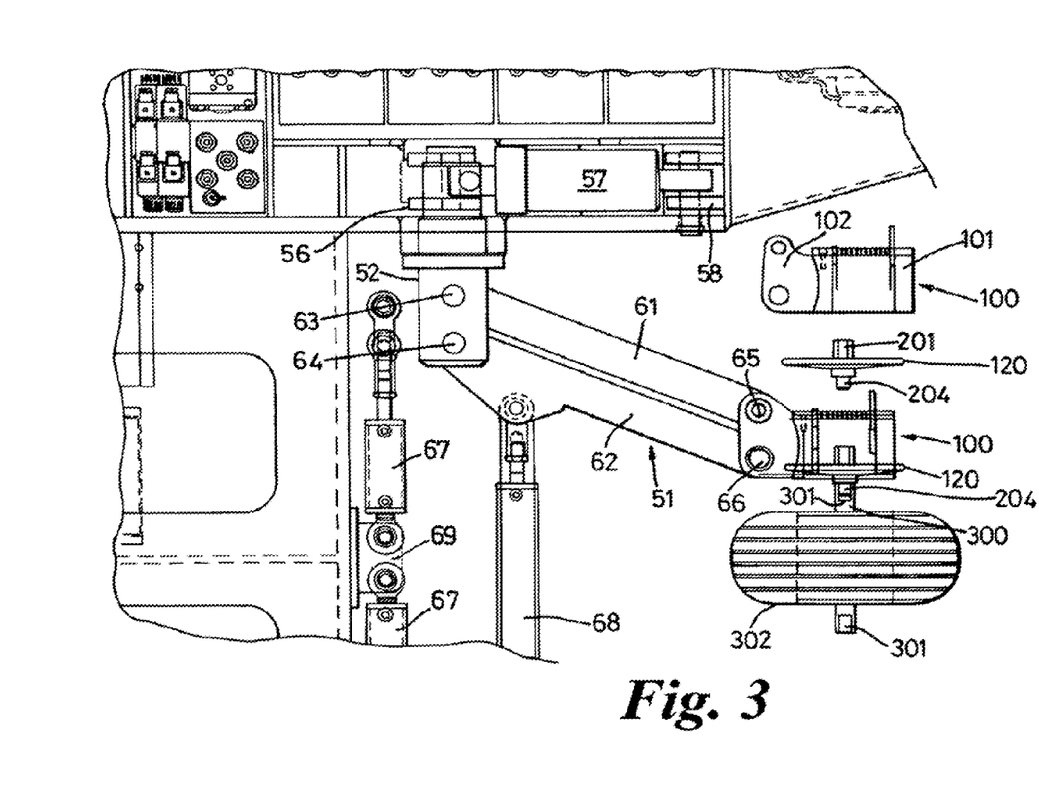
FIG. 3 is an enlarged fragment of FIG. 1.

With reference to FIGS. 1 to 3 of the drawings, there is shown an aircraft handler which is for use in co-operation with an undercarriage of an aircraft, particularly the front undercarriage, and is more particularly for use with a helicopter nose wheel. The handler is self-propelled and can exert a maximum lifting load of between 3½-5½ tonne. The handler is similar to handlers described in GB-A-2391 205 the contents of which are hereby incorporated into the present description.

The handler 10 has a body or chassis 11 which in plan view is substantially "U" shaped or horseshoe shaped having two arms 12 & 13 linked by a bridge 14. The body 10 stands on wheels 15, 16, 17, 18, the wheels 15 & 16 being located at the end portion of each respective arm 12 & 13, and the wheel 17 & 18 are located one to each side of the bridge 14. The bridge 14 is lower than the arms 12 & 13 having a height of about 220 mm as compared with the height of the arms which is about 360 mm. The fronts 12 & 13 of the arms are inclined or chamfered so that the inclined portions and the handler lies substantially within pitch circle struck from the intersection of the centre line CL and the axis of rotation of lifting arms 51 to be described later. Keeping the handler profile within a small pitch circle allows for manoeuvrability whilst under the aircraft.

Each of the chassis arms 12 and 13 is formed from two portions, a respective upwardly facing front compartment 32 and 33 respectively adjacent the bridge 14, and a raised flat end portion 34 and 35 having a height which is substantially equal to the height of the respective arm. The front compartments 32, 33 each house a plurality of battery cells 36 which provide power for the handler 10. The bridge 14 is hollow and houses a battery charger 38 for recharging the battery cells 36, and a pair of interlinked programmable microprocessor units 37, 39.

The front compartment 33 of the arm 13 also houses an isolator 41 for the batteries, a DC/DC converter 40 for supplying power to the microprocessors, and a main power contact switch for supplying power to the handler. The front compartment 32 on the arm 12 also houses an electrically powered hydraulic pump 42 and associated control valves 43, the pump 42 being powered by the batteries 36.

The wheels 17 & 18 are located at the front of the handler 10 and the wheel 18 is a swivel castor wheel and the other front wheel 17 is a steerable wheel mounted on a rotatable plate 23 for steering in a similar manner to that described in GB-A-2391205. Optionally, both wheels 17 & 18 may be steerable.

The wheels 15 and 16 are drive wheels driven by in-wheel drive motors 26 arranged co axially of the wheel. Each drive motor 26 is a DC powered unit driving its respective wheel through a gearbox. Electro-magnetic brake units 27 are also mounted co axially of the wheels on the respective motors 26. The operation of the drive motors 26 and brakes 27 for movement of the handler is controlled through the microprocessor units 37, 39.

The wheels are fixed and the handler is steered by said motors driving the two wheels at different rotational speeds and/or by means of the steerable wheel(s) 17 & 18.

Referring particularly to FIG. 3, the lifting arms 51 are located between the two chassis arms 12 & 13 in opposition to each other and are each pivoted to a stub axle 52 which is mounted for rotation to a respective arm 12 or 13. The two stub axles 52 are coaxial and rotate about a horizontal axis with the respective lifting arms 51 held rotationally fast in one orthogonal axis. The outer ends of the respective stub axles 52 located within the compartments 32, 33 are provided with respective radial lugs 56 which are each connected to a respective hydraulic actuator 57 located within the compartment and extending between the respective lug 56 and a bracket 58 on the respective arm 12 or 13. Operation of the two actuators 57 rotates the two stub axles 52 raising or lowering the lifting arms 51. The actuator 57 extends to raise the arms 51.

The two stub axles 52 are located substantially at the centre of gravity of the handler 10.

The two lifting arms 51 each comprise a pair substantially parallel struts 61, 62 which are located in a diametral slot in the inner end of each respective stub axle 52. The two struts 61, 62 are pivoted at one end thereof in the other orthogonal axis to the respective stub axle 52 by pins 63, 64 which are normal to the slots. The other ends of the two struts 61, 62 are pivoted by pins 65, 66 to a lifting tool 100. The pivot pins 65, 66 are substantially parallel to the pins 63, 64 and the respective stub axle 52, struts 61, 62 and lifting tool 100 form a parallelogram four bar linkage which in use holds the lifting tools 100 substantially horizontal.

An actuator 68 is operable between the outer struts 62 of the support arms 51 to move the lifting tools 100 closer together or further apart. In an alternative arrangement a pair of actuators 67 may act between an anchor 69 on the chassis 11 and a respective outer strut 62.

The hydraulic actuators 57 and 56 are connected by hydraulic hoses (not shown) to the control valves 43 which are in turn operated through the microprocessors 37, 39.

The hydraulic system is provided with a pressure relief valve (not shown) which limits the maximum lifting load provided by the handler 10. The hydraulic pressure acting in the two actuators 57 should be equalised by suitable means.

With reference now also FIGS. 6 to 9, each lifting tool 100 comprises a cylindrical body 101 which has a radial flange 102 secured to its outer cylindrical surface by for example welding. The lifting tool is secured to the struts 61, 62 by means of the flange 102. The lifting tool is illustrated as attached to the lifting arm 51 and is also shown in a detached condition with an adaptor 120 to be described later.

Figure 7:
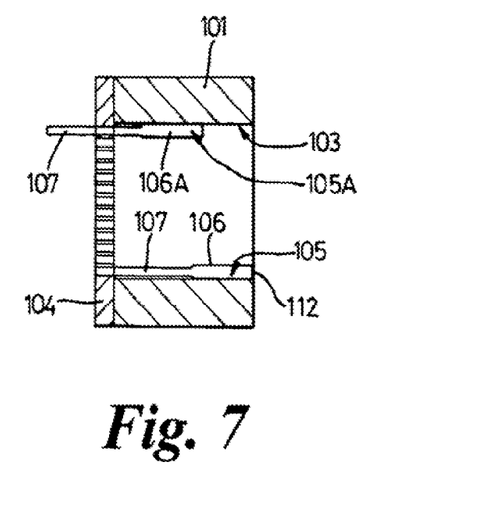
FIG. 7 is a sectional view of the lifting tool taken on the line VII-VII of FIG. 6.
Figure 8:
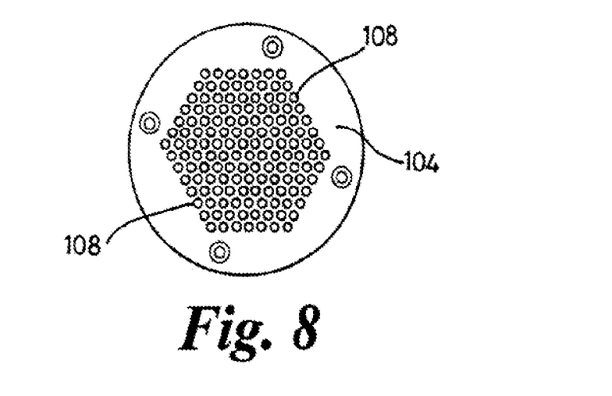
FIG. 8 is a rear view of the lifting tool.
Figure 9:
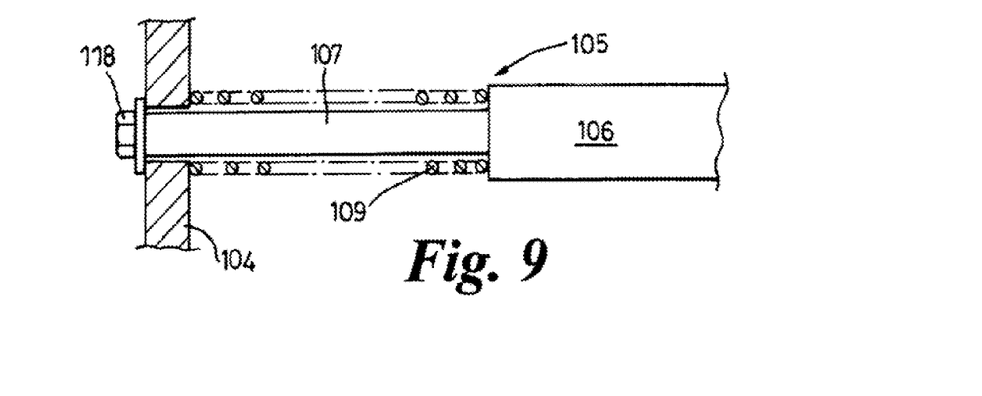
FIG. 9 is a side elevation of a pin.

The body 101 has a cavity 103 formed therein which has a base 104 which in this embodiment is detachable from the main body. The cavity 103 may be any suitable cross-sectional shape, for example circular or polygonal e.g. hexagonal as in the present example. The cavity 103 houses an array of close packed pins 105 which are each in contact with their neighbours. The pins 105 extend axially of the cavity 103 and have a larger diameter head 106 and smaller diameter stem 107. The stems 107 of the pins pass slidingly through respective apertures 108 in the base 104. The outer ends of the stem 107 are provided with abutments 108 that limit the movement of the pins towards the mouth of the cavity 103 under a bias load exerted by coil springs 109 located co axially around each stem 107 and acting between the base 104 and the respective pin head 106. Each pin 105 may be displaced individually under load inwardly of the cavity 103.

Figure 6:
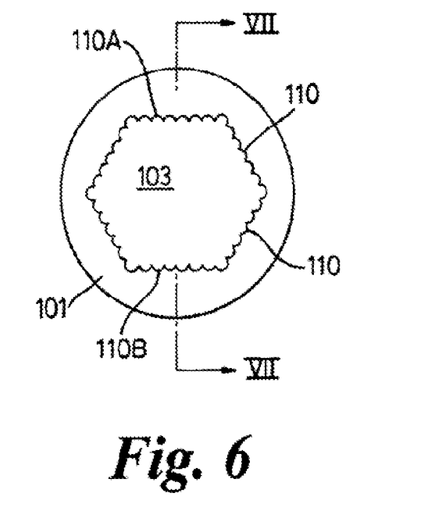
FIG. 6 is a front view of the body of the lifting tool used with the handler.

The pins 105 may be any suitable cross-sectional shape that permits a close packing arrangement. In the present embodiment, the hexagonal cavity is about 90 mm across flats and houses one hundred and forty pins the circular section pins 105 about 8 mm in dia. And which are formed into a close packed hexagonal array. The cavity 103 may be formed with sides 110 having recesses which are shaped to accommodate the adjacent pin, in this example concave arcuate recesses. The array of pins comprises thirteen horizontal rows and fourteen diagonal rows.

In another embodiment not shown, those sides which in use form the substantially horizontal upper and bottom sides 110A, 110B may be planar.

The base 104 and pins 105 may form a subassembly which can be removed from and assembled to the circular body 101 as a unit.

The heads 106 of the pins have a sufficient axial length that when a pin 105A is in a fully retracted condition its head 106A is supported by the heads 106 of the surrounding pins.

The pins 105 have respective end faces 112 which all align one with another to form a planar surface across the mouth of the cavity 103.

Figure 4:
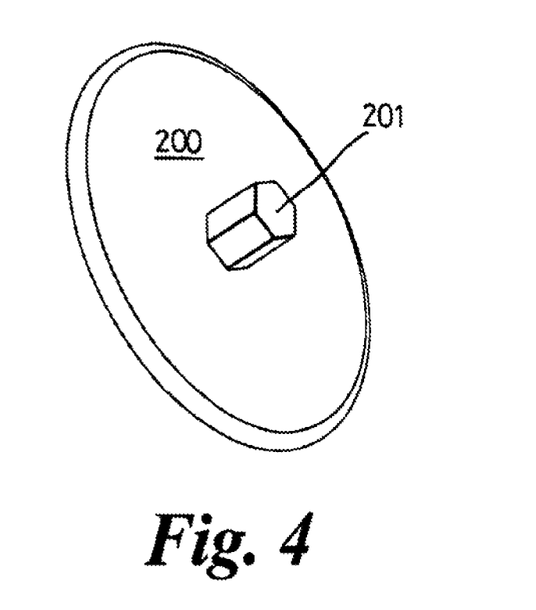
FIG. 4 is a view of adaptor used with the handle as is shown in FIG. 1.
Figure 5:
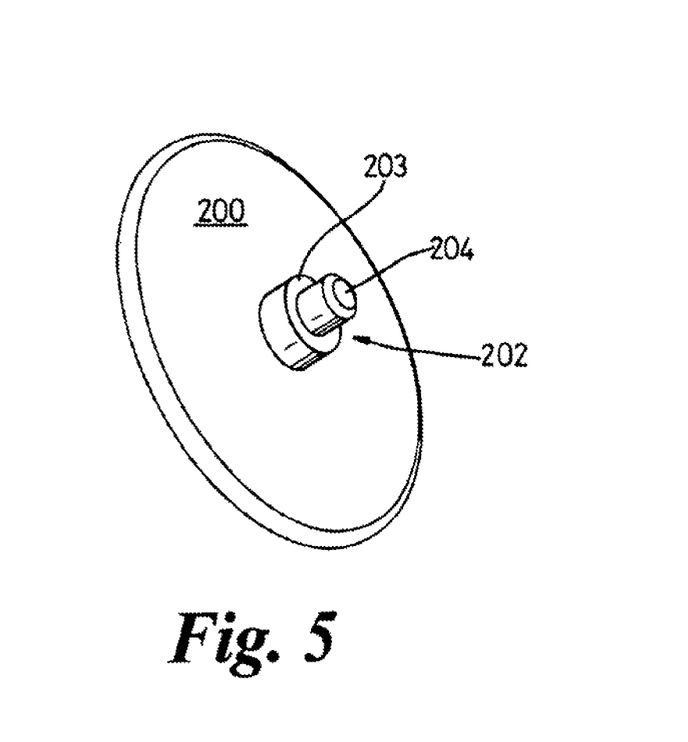
FIG. 5 is a second view of the adaptor.

In some applications it may be necessary to use the lifting tool 100 in combination with an adaptor 120 an example of which is shown in FIGS. 4 and 5. The present adaptor 120 is basically a steel disc 200 having a coaxial hexagonal stud 201 on one side thereof and a coaxial stepped diameter cylindrical stud 202 on the other side thereof. The stud 202 has its larger diameter portion 203 adjacent the disc and smaller diameter portion 204 outwardly thereof. In use the smaller diameter portion is inserted into a hole in a tow point of an aircraft undercarriage, for example, the nose wheel axle. The larger diameter portion abuts the axle end face and ensures that the disc 200 is spaced from the tow point. When using the wheel axle as a tow point this prevents side loads being exerted on the wheel bearings.

The dimensions of the studs 201, 202 will be determined by the size of the tow points and by the load to be lifted. In order to provide a 3¾ Tonne lift, the stud portion 204 may be 18 mm in dia. and the hexagonal stud may be about 25 mm across flats. It may be necessary to have different adaptors for different aircraft, or other lifting applications.

The adaptors may be provided with means for preventing the adaptors from dislodging during the lifting process. For example the stud 202 may be magnetized or its smaller diameter portion provided with spring loaded radial grips.

In use, the smaller diameter portions 204 of the two adaptors 120 are inserted into blind bores 301 in opposite ends of the axle 300 of an aircraft nose wheel 302 and are held in place by the magnetism.

The handler 10 is controlled through the microprocessors 37, 39, 138 and 139 which control the speeds of the drive wheel 15, 16, the angle of the steerable wheel 17, and the operation of the lifting arms 51. In use, the handler is manoeuvred, by an operator using a remote hand set, under the nose of an aircraft and the lifting arms 51 are operated to cause the lifting tools 100 to engage with the two adaptors 120.

The lifting tools 100 are caused to close and the hexagonal studs 201 are received in the cavities 103 of the two opposed lifting tools 100. Pins 105 contacted by the studs 201 are pushed into the cavity until the heads 106 of the pins bottom on their springs 109. The other surrounding pins remain biased fully outwardly. Since the cavity 103 is about 90 mm across its flats and the stud 201 is about 25 mm across its flats it will be apparent that the axis of the cavity need not be aligned with the axis of the stud 201 and aircraft axle. Furthermore the two lifting tools 100 need not be perfectly aligned with each other.

When an initial lift load is applied through the lifting arms 51, the lifting tools 100 will rise to take up any play between the surrounding pins and the stud 201 until a light load is being transferred from the lifting tool body 101 through the closely packed pins 105 to the stud 201. Further hydraulic lift, will be transferred through the closely packed pins 105 to the stud 201, through the adaptor 120 and to the aircraft undercarriage. The pins immediately surrounding the studs 201,202 provide load bearing surfaces transferring the lifting load from the lifting tool body 101 to the aircraft tow point.

The lift load causes a downward reaction force on the handler which increases the traction between the handler wheels and the ground. The lift load may, but not necessarily, cause the wheel 320 to be raised from the ground. The aircraft can then be manoeuvered using the self-propelled handler 10 as is required under the control of an operator.

In other embodiments not shown, the pins 105 may have other cross-sections, such as square or hexagonal, that permit close packing into a substantially continuous array. The cross-section of the cavity 103 may adapted to other shapes to suit the selected shape of pin.

The adaptors 120 may be other shapes and the hexagonal stud 201 may be replaced by a cylindrical stub which could be dimensioned to fit alternative size tow points thereby allowing the adaptor to be utilised for at least two different types of aircraft.

In another embodiment as disclosed in GB 2,391,205 the drive wheels 15 and 16 and motors 26 are mounted as a sub-assembly to a circular plate, or turntable, rotatably mounted under the respective raised end portion 34 or 35 of each arm. The turntables can be rotated by a DC electric motor under the control of the microprocessor units 37, 38.

The holder 10 is also provided with a sound alarm to indicate when the handler is in use and lights for operation of the handler in the dark.

The invention claimed is:

1. An aircraft handler for applying a lift load to an undercarriage of an aircraft, the handler comprising:
   a moveable ground standing body;
   first and second opposed lifting arms having proximal and distal ends, each arm pivotably mounted to the body to rotate about a substantially horizontal pivot axis to thereby lower or raise the distal ends of the arms with respect to the Earth, the proximal end of the first lifting arm pivotably connected to the body to pivot about a first pivot axis, the proximal end of the second lifting arm pivotably connected to the body to pivot about a second pivot axis, the first and second pivot axes oriented at a right angle with respect to the horizontal pivot axis, the first and second opposed lifting arms pivotable about their respective first and second pivot axis to thereby cause the distal ends of the arms to move closer or further from each other to thereby contact or move away from the undercarriage of the aircraft, the first and second opposed lifting arms rotatable about the horizontal pivot axis to thereby lift or lower the undercarriage of the aircraft when the undercarriage is contact by the distal ends of the first and second opposed lifting arms being pivoted towards each other; and a lifting tool mounted at a distal end of each of the first and second lifting arms, each of said lifting tools being connectable to the undercarriage, wherein each of the said lifting tools include:

a body with a cavity; and a plurality of closely packed pins moveably retained within said cavity, the pins biased outwardly of said body and individually axially displaceable within the cavity, said pins pressable against portions of the undercarriage by rotation of the lifting arms about the first and second axes, the pins moveable axially to assume a complementary shape to receive said portions, and to thereby transmit a lifting load to raise said portions as the first and second arms are pivoted about said horizontal axis.

2. The handler of claim 1, further including a pair of adaptors each connected to one of the distal ends of a lifting arm, each adaptor configured to engage an opposite side of the undercarriage, each of the adaptors having a spigot thereon which is engageable with a respective lifting tool, whereby when said pins are pressed against said opposed spigots, the pins assume a complementary shape to receive said spigots and a lifting load applied to said lifting tools is transferred by some of said pins to said adaptor and to the undercarriage.

3. The handler of claim 2, wherein the adaptor is a disc including a stud on one side of the disc and the spigot is positioned on an opposed side of the disc, the stud securable to a tow point of the undercarriage.

4. The handler of claim 1, wherein the pins have outer end faces which together form a substantially continuous planar surface when all the pins are at their maximal axial outer displacement.

5. The handler of claim 1, wherein the pins have a circular cross-section.

6. The handler of claim 1, wherein any one pin when at maximum inward displacement is supported at least in part by adjacent pins.

7. The handler of claim 1, wherein the cavity is provided with a base attached to the body and the inner ends of the pins are slidably mounted to the base.

8. The handler of claim 7, wherein the base of the cavity is detachable from the body allowing the pins and base to be removed and attached as a single sub-assembly.

9. The handler of claim 1, wherein the cavity is hexagonal in section, having six sides, with the pins being cylindrical.

10. The handler of claim 9, wherein in use, two of said six sides of said hexagonal section cavity are substantially horizontal.

11. The handler of claim 10, wherein at least the other four sides of said sides of the hexagonal section cavity are provided with arcuate concave recesses, each of which accommodate an adjacent pin.

12. The handler of claim 1, which is self-propelled and wherein the ground standing body is generally "U" shaped to form two body arms, each body arm having a wheel located on a free end, the first and second lifting arms located between the wheels at the arm ends.

13. The handler of claim 1, further including at least one actuator connected between the lifting arms, thereby configured to move the arms towards or away from each other.

14. An aircraft handler for applying a lift load to an undercarriage of an aircraft, the handler comprising:

a moveable ground standing body;

first and second opposed lifting arms having proximal and distal ends, each arm pivotably mounted to the body to rotate about a substantially horizontal pivot axis to thereby lower or raise the distal ends of the arms with respect to the Earth, the proximal end of the first lifting arm pivotably connected to the body to pivot about a first pivot axis, the proximal end of the second lifting arm pivotably connected to the body to pivot about a second pivot axis, the first and second pivot axes oriented at a right angle with respect to the horizontal pivot axis, the first and second opposed lifting arms pivotable about their respective first and second pivot axis to thereby cause the distal ends of the arms to move closer or further from each other to thereby contact or move away from the undercarriage of the aircraft, the first and second opposed lifting arms rotatable about the horizontal pivot axis to thereby lift or lower the undercarriage of the aircraft when the undercarriage is contact by the distal ends of the first and second opposed lifting arms being pivoted towards each other; and a lifting tool mounted at a distal end of each of the first and second lifting arms, each of said lifting tools being connectable to the undercarriage, wherein the lifting arms are mounted on a pair of coaxial stub axles rotatable about the horizontal axis, said stub axles having outer end portions provided with radial lugs and actuators configured to act between each respective arm of the body and lug to rotate the stub axles to raise or lower the lifting arms.

15. An aircraft handler for applying a lift load to an undercarriage of an aircraft, the handler comprising:

a moveable ground standing body;

first and second opposed lifting arms having proximal and distal ends, each arm pivotably mounted to the body to rotate about a substantially horizontal pivot axis to thereby lower or raise the distal ends of the arms with respect to the Earth, the proximal end of the first lifting arm pivotably connected to the body to pivot about a first pivot axis, the proximal end of the second lifting arm pivotably connected to the body to pivot about a second pivot axis, the first and second pivot axes oriented at a right angle with respect to the horizontal pivot axis, the first and second opposed lifting arms pivotable about their respective first and second pivot axis to thereby cause the distal ends of the arms to move closer or further from each other to thereby contact or move away from the undercarriage of the aircraft, the first and second opposed lifting arms rotatable about the horizontal pivot axis to thereby lift or lower the undercarriage of the aircraft when the undercarriage is contact by the distal ends of the first and second opposed lifting arms being pivoted towards each other; and a lifting tool mounted at a distal end of each of the first and second lifting arms, each of said lifting tools being connectable to the undercarriage, wherein the lifting arms each comprise a pair of substantially parallel struts each of which is pivoted at the proximal end to a stub axle pivotable about the horizontal axis, and the distal end to one of said pair of lifting tools, thereby forming a four bar parallelogram linkage configured to maintain the pair of lifting tools in mutually aligned relationship as the lifting arms are pivoted about their respective first and second axis.

16. An aircraft handler for applying a lift load to an undercarriage of an aircraft, the handler comprising:

a moveable ground standing body;

first and second opposed lifting arms having proximal and distal ends, each arm pivotably mounted to the body to rotate about a substantially horizontal pivot axis to thereby lower or raise the distal ends of the arms with respect to the Earth, the proximal end of the first lifting arm pivotably connected to the body to pivot about a first pivot axis, the proximal end of the second lifting arm pivotably connected to the body to pivot about a second pivot axis, the first and second pivot axes oriented at a right angle with respect to the horizontal pivot axis, the first and second opposed lifting arms pivotable about their respective first and second pivot axis to thereby cause the distal ends of the arms to move closer or further from each other to thereby contact or move away from the undercarriage of the aircraft, the first and second opposed lifting arms rotatable about the horizontal pivot axis to thereby lift or lower the undercarriage of the aircraft when the undercarriage is contact by the distal ends of the first and second opposed lifting arms being pivoted towards each other; and a lifting tool mounted at a distal end of each of the first and second lifting arms, each of said lifting tools being connectable to the undercarriage, further including an adaptor having a disc, a first spigot to one side of the disc and coaxial therewith, engageable within the cavity of a lifting tool, and a second spigot on the other side of the disc, also coaxial with the disc and configured for engaging a cavity within a tow point on the undercarriage.

17. A method of application of a lifting load to an object in which a lifting apparatus according to claim 1 is maneuvered to a location adjacent said object and the lifting tools are caused to engage opposed portions of the object to be lifted when on the ground, and then applying a lifting load to said object.

18. The method of claim 17, wherein an adaptor is attached to each side of a tow point on an aircraft undercarriage, and the two lifting tools are each configured to engage a respective adaptor, so attached, for application of a lifting load to the undercarriage.

19. An aircraft handler for applying a lifting load to an undercarriage of an aircraft, and which includes a lifting apparatus comprising a pair of lifting tools for engaging opposed portions of an undercarriage for lifting, each lifting tool having a body with a cavity therein filled with a plurality of closely packed pins which provide load bearing surfaces which in use engage a portion of said object, the pins being individually axially displaceable within the cavity to permit limited movement of at least some of said pins on insertion of a respective portion of the undercarriage into the cavity with other pins surrounding said portion providing support and transferring the lift load to the surrounding body.

* * * * *